No. 655,445. Patented Aug. 7, 1900.
F. L. KOEHLER.
SPRING BEARING FOR BICYCLES OR OTHER VEHICLES.
(Application filed Sept. 18, 1899.)
(No Model.) 2 Sheets—Sheet 1.
Fig. 1.
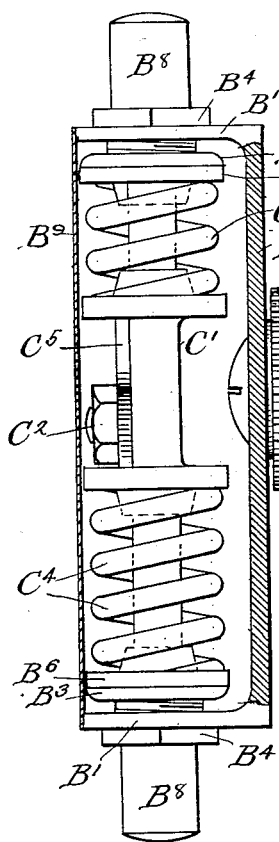
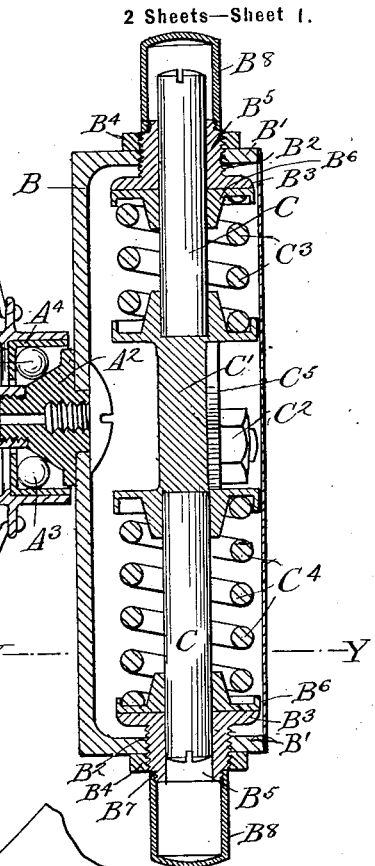
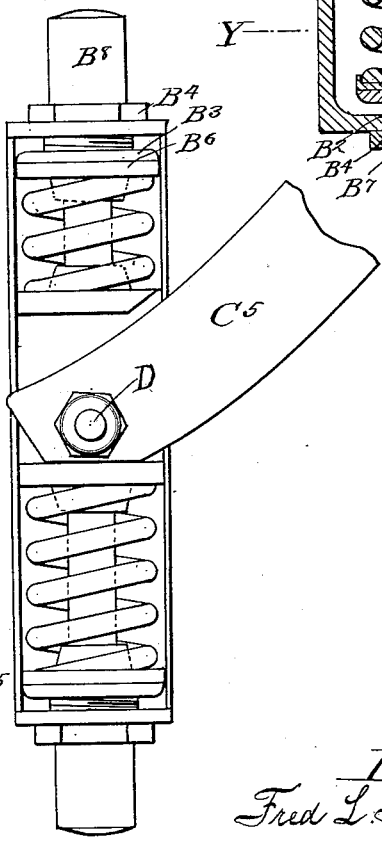
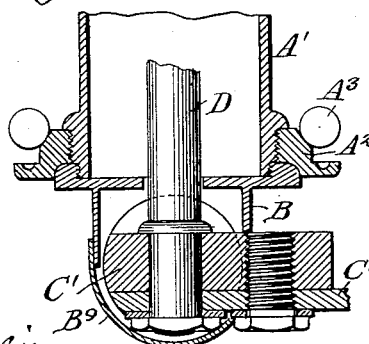
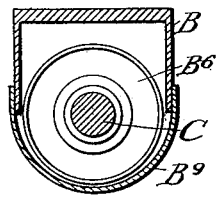
Fig. 2.
Fig. 6.
Fig. 7.
Witnesses:
R. J. Jacker,
John Bunte.
Inventor:
Fred L. Koehler
By Alfred Meltzer
his Atty.
THE NORRIS PETERS CO., PHOTO-LITHO., WASHINGTON, D. C.

No. 655,445. Patented Aug. 7, 1900.
F. L. KOEHLER.
SPRING BEARING FOR BICYCLES OR OTHER VEHICLES.
(Application filed Sept. 18, 1899.)
(No Model.) 2 Sheets—Sheet 2.
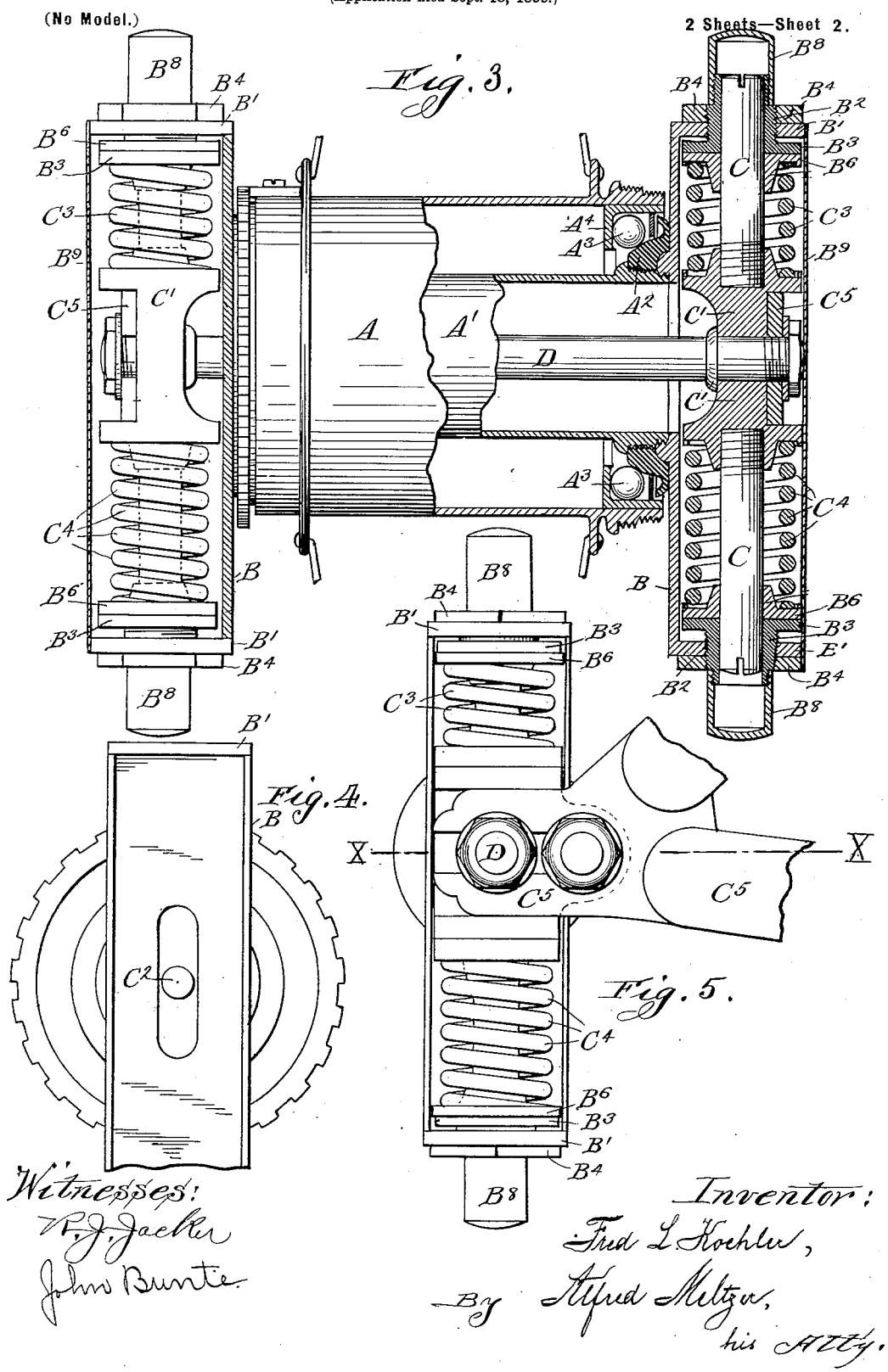

UNITED STATES PATENT OFFICE.

FRED L. KOEHLER, OF CHICAGO, ILLINOIS, ASSIGNOR OF ONE-THIRD TO THOMAS J. DUNNE, OF DUBUQUE, IOWA.

SPRING-BEARING FOR BICYCLES OR OTHER VEHICLES.

SPECIFICATION forming part of Letters Patent No. 655,445, dated August 7, 1900.

Application filed September 18, 1899. Serial No. 730,865. (No model.)

*To all whom it may concern:*

Be it known that I, FRED L. KOEHLER, a citizen of the United States, residing at Chicago, in the county of Cook and State of Illinois, have invented certain new and useful Improvements in Spring-Bearings for Bicycles or other Vehicles, of which the following is a specification.

The object of this invention is the production of an improved spring-bearing for bicycles and other vehicles.

The invention is shown herein in its application to a safety-bicycle.

In the accompanying drawings, Figure 1 is a front view, partly in section, of the hub of the forward wheel of a bicycle embodying my invention. Fig. 2 is a side elevation of certain of the parts shown in Fig. 1. Fig. 3 is a front view, partly in section, of the hub of the rear wheel of a bicycle embodying my invention in a slightly-modified form. Fig. 4 is a side elevation of one of the tubular spring-casings, the springs being removed and the lower part of the casing broken away. Fig. 5 is a side elevation of the parts shown in Fig. 3. Fig. 6 is a sectional view on dotted line X X of Fig. 5; and Fig. 7 is likewise a horizontal section on dotted line Y Y of Fig. 1, the spring being omitted from the latter view.

Like letters of reference indicate corresponding parts throughout the several views.

In the embodiment here shown of this invention the ordinary ball-bearings are used, the two cones of said ball-bearings being fixed on the opposite ends of a shaft. To the outer face of each of these cones is rigidly attached a spring-casing having centrally-perforated ends. Each of said spring-casings contains a bearing-block capable of a vertical movement, being guided in said movement by two alined pins, which pins lie in the central perforations in the ends of the spring-casing. A coil-spring surrounds each of said pins and cushions both the upward and the downward movement of the bicycle-frame, the bicycle-forks being rigidly secured to the sides of the bearing-blocks.

Referring to the drawings, A is the hub of a bicycle-wheel, and A' a sleeve for rigidly securing the cones $A^2$ together.

$A^3$ indicates the balls, and $A^4$ the cup of the ordinary ball-bearing.

The spring-casings B, cut away at their outer sides to permit access to their interiors, are secured by any suitable means rigidly to the outer ends of the cones $A^2$. These spring-casings B are intended in use to stand in a vertical position. They have the closed upper and lower ends B', perforated centrally by the alined screw-threaded openings $B^2$, which screw-threaded openings are adapted to receive the correspondingly screw-threaded adjusting-studs $B^3$. The lock-nuts $B^4$ hold the adjusting-studs $B^3$ in any desired position of adjustment. These adjusting-studs $B^3$ are provided with the central alined openings $B^5$ and bear at their inner ends the spring-sockets $B^6$, each of which sockets has a central opening coincident with the alined openings $B^5$ of the adjusting-studs $B^3$. Each of the adjusting-studs $B^3$ is also provided with a screw-threaded boss $B^7$, intended to receive the dust-cap $B^8$. The outer side of each of the spring-casings B is closed by a curving cover $B^9$, of sheet metal, secured in position in any suitable manner.

Two guide-pins C lie within the alined openings $B^5$ of the adjusting-studs $B^3$, extending also through the central openings of the spring-sockets $B^6$. These guide-pins C are fixed in the bearing-block C' on opposite sides thereof, being screw-threaded therein in this instance, and one of the forks of the bicycle is secured in any suitable manner, as by the bolt $C^2$, to each of the said bearing-blocks C'. The upper and lower sides of the bearing-blocks C', surrounding the guide-pins C, are formed to correspond with the face of the spring-socket $B^6$, and between said bearing-block C' and each of said spring-sockets $B^6$, upon the guide-pins C, have been placed the two coil compression-springs $C^3$ and $C^4$, the former above and the latter below the bearing-block C'.

$C^5$ represents one of the forks of a bicycle-frame.

From the construction detailed it will be seen that the weight upon the forks of the bicycle carried upon the bearing-blocks C' is borne by the lower springs $C^4$, and the upward jolts of the bicycle-frame are cushioned by the upper springs C³, the proper tension of said springs according to the weight of the rider and the condition of the road being obtained by an adjustment of the studs B³.

Fig. 3 illustrates a form of this spring-bearing slightly modified in detail. In this form a rod D extends through the sleeve A' and secures the bearing-blocks C' rigidly together. The means of attachment of the spring-casings B to the cones A² is also somewhat different from the means illustrated in Fig. 1. This modified form is shown in connection with the rear wheel of the bicycle; but the form of bearing illustrated in Fig. 1 may be used for the rear wheel as well.

While I have described my invention in its application to bicycles, it is clear that it can be used in connection with any wheeled vehicle.

I claim as my invention—

1. In a spring-bearing for bicycles and other vehicles, in combination, an axle; a spring-casing fixed with relation thereto, which casing is provided in its opposite ends with two alined screw-threaded openings; a perforated adjusting-stud for each of said openings; a bearing-block; means for securing one of the supports for the vehicle-body to the bearing-block; two oppositely-extending guide-pins adapted to lie within the openings in the adjusting-studs; and a spring on each of said guide-pins between the bearing-block and one end of the spring-casing.

2. In a spring-bearing for bicycles and other vehicles, in combination, an axle; a spring-casing fixed with relation thereto, which casing is provided in its opposite ends with two alined screw-threaded openings; a perforated screw-threaded adjusting-stud for each of said openings; a lock-nut, a dust-cap, and a spring-socket for each of said adjusting-studs; a bearing-block; means for securing one of the supports for the vehicle-body to the bearing-block; two oppositely-extending guide-pins fixed in said block and adapted to lie within the openings in the adjusting-studs; and a spring on each of said guide-pins between the bearing-block and one of the said spring-sockets.

3. In a spring-bearing for bicycles and other vehicles, in combination, an axle; a cone fixed on each end thereof; a ball-race; balls therein; a spring-casing rigidly secured to each cone; a bearing-block in each spring-casing; means for securing the supports for the vehicle-body to said bearing-blocks; a guide-pin for each bearing-block; and a spring on said guide-pin between the bearing-block and one end of the spring-casing.

4. In a spring-bearing for bicycles and other vehicles, in combination, an axle; a cone fixed at each end thereof; a ball-race; balls therein; a spring-casing rigidly secured to the outer side of each cone, which casing is provided in its opposite ends with two alined openings; a bearing-block for each spring-casing; means for securing the supports for the vehicle-body to said bearing-blocks; two oppositely-extending guide-pins fixed in each of said bearing-blocks, and adapted to lie within said alined openings; and a spring on each of said guide-pins between the bearing-block and one end of the spring-casing.

5. In a spring-bearing for bicycles and other vehicles, in combination, an axle; a cone fixed at each end thereof; a ball-race; balls therein; a spring-casing rigidly secured to the outer side of each cone, which casing is provided in its opposite ends with two alined openings; a perforated adjusting-stud in each of said openings; a spring-socket, a lock-nut, and a dust-cap for each one of said adjusting-studs; a bearing-block for each of said spring-casings; means for securing the supports for the vehicle-body to said bearing-blocks; two oppositely-extending guide-pins adapted to lie within the openings in the adjusting-studs; and a spring on each of said guide-pins between the bearing-block and the spring-socket of each adjusting-stud.

6. In a spring-bearing for bicycles and other vehicles, the combination, with an axle, of a cone screwed into each end of said axle, and provided with a shoulder; casings arranged vertically at the ends of the hub; screws clamping the casings against the shoulders of the cones; a bearing-block in each one of said casings; means for securing the supports for the vehicle-body to said bearing-blocks; pins connected to said bearing-blocks and projecting therefrom, to operate through the ends of the casings; and springs adjustably mounted on said pins.

7. In a spring-bearing for bicycles and other vehicles, the combination with an axle, of a cone screwed into each end of said axle and provided with a shoulder, casings arranged vertically at the ends of the hub, screws clamping the casings against the shoulders of the cones, a bearing-block in each one of said casings; means for securing the supports for the vehicle-body to said bearing-block; pins connected to said bearings and projecting therefrom to operate through the ends of the casings and springs adjustably mounted on said pins.

FRED L. KOEHLER.

Witnesses:
ALFRED MELTZER,
JOHN BUNTE.